(12) United States Patent
Kalthoff et al.

(10) Patent No.: US 9,400,836 B2
(45) Date of Patent: Jul. 26, 2016

(54) EXTERNAL EVALUATION PROCESSES

(75) Inventors: Wolfgang Kalthoff, Bad Schonborn (DE); Thomas Vogt, Römerberg (DE); Guenter Huber, Oberkirch (DE); Guido Hoeckele, Knittlingen (DE)

(73) Assignee: SAP SE, Walldorf (DE)

( * ) Notice: Subject to any disclaimer, the term of this patent is extended or adjusted under 35 U.S.C. 154(b) by 716 days.

(21) Appl. No.: 13/370,188

(22) Filed: Feb. 9, 2012

(65) Prior Publication Data

US 2012/0143926 A1 Jun. 7, 2012

Related U.S. Application Data

(63) Continuation of application No. 11/584,955, filed on Oct. 23, 2006, now Pat. No. 8,117,157, which is a continuation of application No. 10/328,716, filed on Dec. 23, 2002, now Pat. No. 7,133,878.

(60) Provisional application No. 60/367,397, filed on Mar. 21, 2002.

(51) Int. Cl.
*G06F 17/30* (2006.01)
*G06Q 10/06* (2012.01)
*G06Q 10/08* (2012.01)

(52) U.S. Cl.
CPC .......... *G06F 17/30604* (2013.01); *G06Q 10/06* (2013.01); *G06Q 10/087* (2013.01); *Y10S 707/99942* (2013.01); *Y10S 707/99943* (2013.01); *Y10S 707/99945* (2013.01)

(58) Field of Classification Search
USPC .......................... 707/611, 614, 645, 651, 638
See application file for complete search history.

(56) References Cited

U.S. PATENT DOCUMENTS

| | | |
|---|---|---|
| 4,459,663 A | 7/1984 | Dye |
| 5,099,431 A | 3/1992 | Natarajan |
| 5,182,705 A | 1/1993 | Barr et al. |
| 5,191,534 A | 3/1993 | Orr et al. |
| 5,311,424 A | 5/1994 | Mukherjee et al. |
| 5,335,346 A | 8/1994 | Fabbio |
| 5,418,945 A | 5/1995 | Carter et al. |
| 5,442,782 A | 8/1995 | Malatesta et al. |

(Continued)

FOREIGN PATENT DOCUMENTS

| | | |
|---|---|---|
| CA | 2391829AA | 6/2001 |
| DE | 10049940 A1 | 4/2002 |

(Continued)

OTHER PUBLICATIONS

"U.S. Appl. No. 10/328,716, Advisory Action mailed Apr. 25, 2006", 3 pgs.

(Continued)

*Primary Examiner* — Sana Al Hashemi
(74) *Attorney, Agent, or Firm* — Schwegman Lundberg & Woessner, P.A.

(57) ABSTRACT

System and method to manage external data in a product creation process is provided. The method comprises receiving a first product structure from a central module, storing the first product structure in the data storage system, performing, evaluations on the first product structure and storing results of the evaluations in the data storage system. The results of the evaluations are transmitted to a central module.

18 Claims, 7 Drawing Sheets

(56) References Cited

U.S. PATENT DOCUMENTS

| | | | |
|---|---|---|---|
| 5,655,085 A | 8/1997 | Ryan et al. | |
| 5,694,598 A | 12/1997 | Durand et al. | |
| 5,703,938 A | 12/1997 | Lucas et al. | |
| 5,710,884 A | 1/1998 | Dedrick | |
| 5,859,972 A | 1/1999 | Subramaniam et al. | |
| 5,911,139 A | 6/1999 | Jain et al. | |
| 5,966,715 A | 10/1999 | Sweeney et al. | |
| 6,018,742 A | 1/2000 | Herbert, III | |
| 6,032,147 A | 2/2000 | Williams et al. | |
| 6,067,525 A | 5/2000 | Johnson et al. | |
| 6,226,650 B1 | 5/2001 | Mahajan et al. | |
| 6,236,997 B1 | 5/2001 | Bodamer et al. | |
| 6,324,647 B1 | 11/2001 | Bowman-Amuah | |
| 6,366,930 B1* | 4/2002 | Parker et al. | |
| 6,405,132 B1 | 6/2002 | Breed et al. | |
| 6,480,755 B1 | 11/2002 | Ootani et al. | |
| 6,567,818 B1 | 5/2003 | Frey et al. | |
| 6,711,456 B2 | 3/2004 | Yokomori et al. | |
| 6,738,682 B1 | 5/2004 | Pasadyn | |
| 6,754,666 B1 | 6/2004 | Brookler et al. | |
| 6,768,944 B2 | 7/2004 | Breed et al. | |
| 6,857,123 B1 | 2/2005 | Nuxoll et al. | |
| 6,879,976 B1 | 4/2005 | Brookler et al. | |
| 6,883,136 B1 | 4/2005 | Brookler et al. | |
| 6,895,408 B1 | 5/2005 | Kavantzas | |
| 6,915,287 B1 | 7/2005 | Felsted et al. | |
| 7,103,605 B1 | 9/2006 | Hazi et al. | |
| 7,809,659 B1 | 10/2010 | Paiz | |
| 8,117,157 B2 | 2/2012 | Kalthoff et al. | |
| 2002/0072956 A1* | 6/2002 | Willems et al. | 705/10 |
| 2002/0087510 A1 | 7/2002 | Weinberg et al. | |
| 2002/0095454 A1 | 7/2002 | Reed et al. | |
| 2002/0116417 A1 | 8/2002 | Weinberg et al. | |
| 2002/0124005 A1 | 9/2002 | Matson et al. | |
| 2002/0138317 A1 | 9/2002 | Mok et al. | |
| 2002/0156688 A1 | 10/2002 | Horn et al. | |
| 2002/0161778 A1 | 10/2002 | Linstedt | |
| 2002/0184308 A1 | 12/2002 | Levy et al. | |
| 2002/0194196 A1 | 12/2002 | Weinberg et al. | |
| 2003/0161778 A1 | 8/2003 | De Waal | |
| 2003/0182298 A1 | 9/2003 | Kalthoff et al. | |
| 2003/0191832 A1 | 10/2003 | Satyavolu et al. | |
| 2003/0233347 A1 | 12/2003 | Weinberg et al. | |
| 2004/0015408 A1 | 1/2004 | Rauen et al. | |
| 2005/0038551 A1 | 2/2005 | Mazumder et al. | |
| 2005/0060271 A1* | 3/2005 | Vig | 705/400 |
| 2009/0138342 A1 | 5/2009 | Otto et al. | |

FOREIGN PATENT DOCUMENTS

| | | |
|---|---|---|
| WO | WO-0137097 A1 | 5/2001 |
| WO | WO-0225471 A2 | 3/2002 |
| WO | WO-0225471 A3 | 3/2002 |
| WO | WO-0225500 A3 | 3/2002 |
| WO | WO-0247463 A3 | 6/2002 |
| WO | WO-03081469 A2 | 10/2003 |
| WO | WO-03081469 A3 | 10/2003 |
| WO | WO-03093998 A2 | 11/2003 |

OTHER PUBLICATIONS

"U.S. Appl. No. 10/328,716, Final Office Action mailed Dec. 14, 2005", 5 pgs.

"U.S. Appl. No. 10/328,716, Non-Final Office Action mailed Aug. 8, 2005", 7 pgs.

"U.S. Appl. No. 10/328,716, Notice of Allowance mailed Jul. 25, 2006", 8 pgs.

"U.S. Appl. No. 10/328,716, Response filed Apr. 13, 2006 to Final Office Action mailed Dec. 14, 2005", 13 pgs.

"U.S. Appl. No. 10/328,716, Response filed Sep. 8, 2005 to Restriction Requirement mailed Aug. 8, 2005", 2 pgs.

"U.S. Appl. No. 10/328,716, Response filed Nov. 8, 2005 to Non-Final Office Action mailed Aug. 8, 2005", 13 pgs.

"U.S. Appl. No. 11/584,955 response filed Mar. 11, 2009 to Restriction Requirement mailed Feb. 9, 2009", 6 pgs.

"U.S. Appl. No. 11/584,955 Final Office Action mailed Oct. 18, 2010", 7 pgs.

"U.S. Appl. No. 11/584,955 Non-Final Office Action mailed May 22, 2009", 8 pgs.

"U.S. Appl. No. 11/584,955 Preliminary Amendment mailed Oct. 23, 2006", 7 pgs.

"U.S. Appl. No. 11/584,955, Examiner Interview Summary Request mailed Feb. 9, 2009", 2 pgs.

"U.S. Appl. No. 11/584,955, Final Office Action mailed Jan. 15, 2010", 19 pgs.

"U.S. Appl. No. 11/584,955, Non-Final Office Action mailed Apr. 28, 2010", 19 pages.

"U.S. Appl. No. 11/584,955, Non-Final Office Action mailed Nov. 7, 2008", 8 pgs.

"U.S. Appl. No. 11/584,955, Notice of Allowance mailed Jun. 27, 2011", 2 pgs.

"U.S. Appl. No. 11/584,955, Notice of Allowance mailed Oct. 18, 2011", 6 pgs.

"U.S. Appl. No. 11/584,955, Pre-Appeal Brief Request filed Mar. 18, 2011", 5 pgs.

"U.S. Appl. No. 11/584,955, Response filed Sep. 9, 2009 to Non Final Office Action mailed May 22, 2009", 8 pgs.

"U.S. Appl. No. 11/584,955, Response filed Dec. 23, 2010 to Final Office Action mailed Oct. 18, 2010", 11 pgs.

"U.S. Appl. No. 11/584,955, Response filed Apr. 14, 2010 to Final Office Action mailed Jan. 15, 2010", 10 pgs.

"U.S. Appl. No. 11/584,955, Response filed Jul. 28, 2010 to Non Final Office Action mailed Apr. 28, 2010", 10 pgs.

"U.S. Appl. No. 11/584,955, Restriction Requirement mailed Feb. 9, 2009", 5 pgs.

"U.S. Appl. No. 12/201,048, Notice of Allowability mailed Sep. 9, 2011", 2 pgs.

"Data Profiling the Foundation for Data Management", DataFlux Corporation, (Jul. 1, 2004), 18 pgs.

"European Application Serial No. 03722973.9, Office Action mailed Mar. 2, 2005", 6 pgs.

"International Application Serial No. PCT/IB03/02025, International Search Report mailed Dec. 19, 2003", 6 pgs.

"SyncML Protocol, Version 1.0", Internet Citation, XP002217356, (Dec. 7, 2000), 60 pgs.

Berndtsson, et al., "Task Sharing Among Agents Using Reactive Rules", Cooperative Operation Systems, Proceedings of the Second IFCIS International, (Jun. 24, 1997), 56-65.

Bertino, Elisa, et al., "Data Security", Proceedings of the Twenty-Second Annual International Computer Software and Applications Conference, Vienna, Austria, Aug. 19-21, 1998 & Los Alamitos, CA, USA, Aug. 19, 1998, (CompSAC '98), XP010305455, (Aug. 19, 1998), 228-237.

Bon, M., et al., "Sharing Product Data Among Heterogeneous Workflow Environments", CAD 2002: Corporate Engineering Research, German Informatics Society, Mar. 4-5, 2002, Dresden, Germany, XP002268575, (Mar. 4, 2002), 1-10.

Chan, Yumman, et al., "Designing Multinational Online Stores: Challenges, Implementation Techniques and Experience", IBM Center of Advanced Studies Conference: Proceedings of the 2000 conference of the center for Advanced Studies on Collaborative research, Mississauga, Ontario, Canada, (2000), 1-14.

Chandramouli, Ramaswamy, "Application of XML Tools for Enterprise-Wide RBAC Implementation Tasks", Proceedings of the 5th ACM Workshop on Role-Based Access Control, Berlin, Germany, XP000958089, (Jul. 26, 2000), 11-18.

Chaudhuri, Surajit, et al., "An Overview of Data Warehousing and OLAP Technology", SIGMOD Record, New York, NY, USA, vol. 26(1), XP002193792, ISSN 0163-5808, (Mar. 1997), 65-74.

Choi, Jin Oh, et al., "Update Propagation of Replicated Data in Distributed Spatial Databases", Proceedings of Database and Expert Systems Applications: Tenth International Conference, Florence, Italy, Aug. 30, 1999-Sep. 2, 1999, DEXA '99 (Lecture Notes in Computer Science vol. 1677), Berlin, Germany, Springer-Verlag, Germany, XP009022583, (Aug. 30, 1999), 952-963.

(56) References Cited

OTHER PUBLICATIONS

Chou, H-T., et al., "Versions and Change Notification in an Object-Oriented Database System", Proceedings of the Design Automation Conference, Anaheim, Jun. 12-15, 1988, Proceedings of the Design Automation Conference (DAC), New York, XP010013006, ISBN: 0-8186-0864-1, IEEE, US, vol. Conf. 25, (Jun. 12, 1988), 275-281.

Ferreira, Rezende, et al., "A Lock Method for KBMS's Using Abstraction Relationship's Semantics", Proceedings of the International Conference on Information and Knowledge Management, CIKM, ACM, New York, USA, XP002943684, (1994), 112-121.

Garcia, et al., "Immunization Registries DeDuplication and Record Matching", White Paper, (1999), 1-11.

Georgakopoulos, et al., "An Overview of Workflow Management: From Process Modeling to Workflow Automation Infrastructure", Distributed and Parallel Databases, vol. 3 (2), (1995), 119-153.

Haerder, T., et al., "Integritaetskontrolle", Datenbanken Konzepte und Techniken Der Implementierung, XP002294581 [translation provided], (1999), 397-405.

Haerder, T., et al., "RX—Sperrverfahren", Datenbanken Konzepte und Techniken Der Inplementierung, XP002294552 (Translation Provided), (1999), 419-420.

Hill, et al., "Data Transformation: Key to Information Sharing", Gartner Group Strategic Analysis Report, (Sep. 29, 1998), 1-60.

Hong, Bonghee, et al., "Modeling of Version Relationships for CAD Databases", Computers and Communications Technology Toward 2000, Seoul, Aug. 25-28, 1987, Proceedings of the Region 10 Conference, (TENCON), New York, IEEE, US, vol. 1, Conf. 3, XP000011783, (Aug. 25, 1987), 142-146.

Kamita, T., et al., "A Database Architecture and Version Control for Group Work", System Sciences, 1994, vol. III : Information Systems: Decision Support and Knowledge-Based Systems, Proceedings of the Twenty-Seventh Hawaii International Conference on Wailea, HI, US, Jan. 4-7, 1994, Los Alamitos, CA, US, IEEE Comput. Soc., XP010097053, ISBN: 0-8186-5070-2, (Jan. 4, 1994), 438-447.

Rahm, Erhard, et al., "Data Cleaning: Problems and Current Approaches", IEEE Bulletin of the Technical Committee on Data Engineering, vol. 23(4), http://lips.informatik.uni-leipzig.de:80/pub/2000-45, XP002284896, (Dec. 2000), 11 pgs.

Rana, S P, et al., "Version Support for Manufacturing Database Systems", International Conference on Industrial & Engineering Applications of Artificial Intelligence & Expert Systems, Tullahoma, IN, US New York, US, vol. 2, XP000605772, (Jun. 6, 1989), 779-784.

Sheth, Amit P, et al., "Federated Database Systems for Managing Distributed, Heterogeneous, and Antonomous Databases", ACM Computing Surveys, 22(3), (1990), 184-236.

\* cited by examiner

EXTERNAL EVALUATION PROCESSES

CROSS-REFERENCE TO RELATED APPLICATIONS

This application is a continuation of U.S. application Ser. No. 11/584,955 filed on Oct. 23, 2006, now U.S. Pat. No. 8,117,157, entitled "External Evaluation Processes," which is a continuation of U.S. patent application Ser. No. 10/328,716, filed on Dec. 23, 2002, now U.S. Pat. No. 7,133,878, entitled "External Evaluation Processes," and claims priority to U.S. Provisional Application No 60/367,397, filed on Mar. 21, 2002, which applications are incorporated in their entirety herein by reference.

BACKGROUND

The present invention relates to data processing, and more particularly, to managing data received from external processes.

An important factor in the success of businesses in the current era is the ability to flexibly react to the requirements of the market. Shorter product cycles require decreased product development times and quicker introduction to market while increased customer demands for individual solutions increases the number of variants.

These factors require businesses to be able to proceed simultaneously with the definition of the product requirements and its structure, while participating in collaborative processes with external entities such as subcontractors and development partners. New products must be introduced rapidly to market based on internally and externally defined requirements. In order to do this, different approaches must be considered, and input can be provided by external entities performing external evaluation processes.

External processes can include, for example, verification processes, costing evaluations and crash tests (for automobile production systems).

BRIEF DESCRIPTION OF THE DRAWINGS

Like reference numbers and designations in the various drawings indicate like elements.

DETAILED DESCRIPTION

Figure 1:
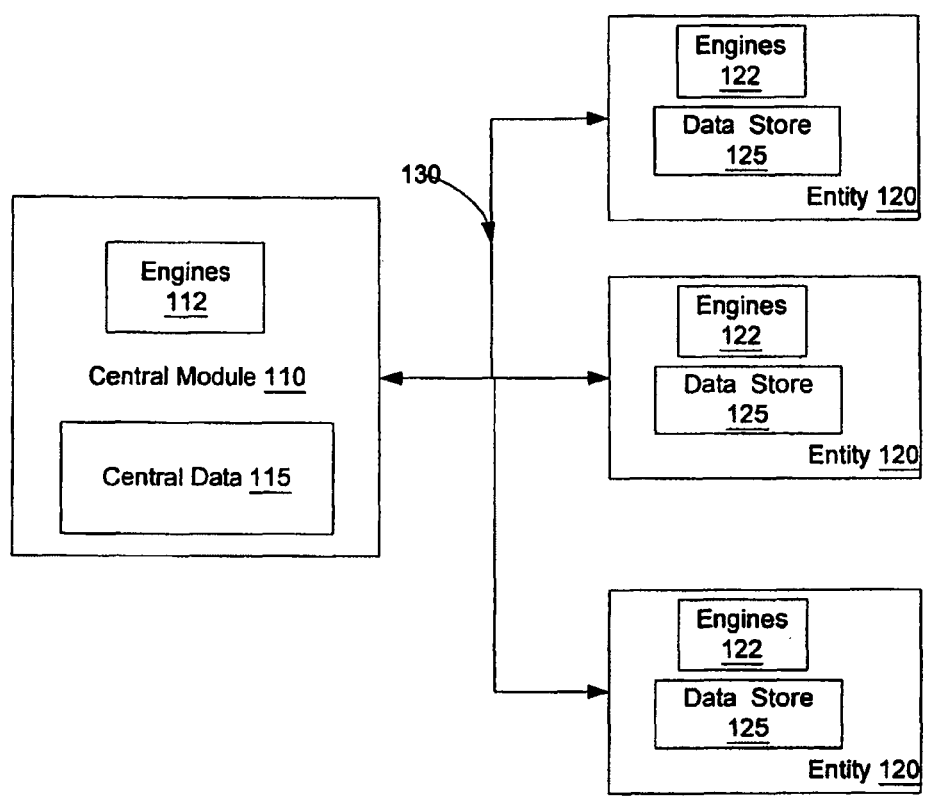
FIG. 1 is a block diagram illustrating an implementation of a product creation system.

As shown in FIG. 1, an external data management system can be implemented in a product creation system. The product creation system includes a central module 110 and entity modules 120. Each of modules 110, 120 includes a data store 115, 125, and engines 112, 122. Engines 112, 122 can represent one or more engines for performing processes in modules 110, 120.

The central module 110 represents a centralized control for a product creation process. The entity modules 120 represent entities involved in the product creation process. Typically, many entities can participate in the development of a product.

The entities can include internal and external entities. For example, entity modules 120 can include modules for testing, cost management, verification, and digital mockup. These entity modules 120 can forward data to the central module 110 which other services use for their processes. The central module 110 and the entity modules 120 can communicate through a network 130.

The central module 110 includes a central data store 115 that stores master data for a product creation process. The central data can be accessed by the entity modules 120 or transmitted to the entity modules 120 through network 130. Each of the entity modules 120 includes a data store 125 for storing the data received from the central module 110 and for additional entity specific data developed in a given entity module 120. For example, if the entity module 120 is a verification module, the corresponding data store 125 can store additional data used to complete a verification process. The entity specific data can be transmitted to the central data store 115.

Data for the product creation process can be stored in records in the data stores 115, 125. The data includes objects associated with the product creation process. These objects can include product classes, attributes, product line designs, parts lists, materials lists, quality characteristics, and requirements. The objects can be organized in the data store with relation to products, product lines, and classes of products, as described below with reference to FIG. 2 and FIG. 3.

The entity modules 120 can perform evaluations related to the product creation process in parallel or asynchronously through engines 122. Each developing entity module 120 can develop different versions of each object of the product creation process. Each evaluating entity module 120 can perform evaluations based on different versions of products or product lines stored in the central module 110.

The central module 110 and the entity modules 120 can include one or more computer systems, computer applications and/or individual or groups of users. The processes performed at the central module 110 and the entity modules 120 can be performed in engines 112 by computer applications and/or users. Each entity module 120 can include modules to perform evaluations such as cost calculations, crash tests, verifications and other evaluations related to a product creation process.

Figure 2:
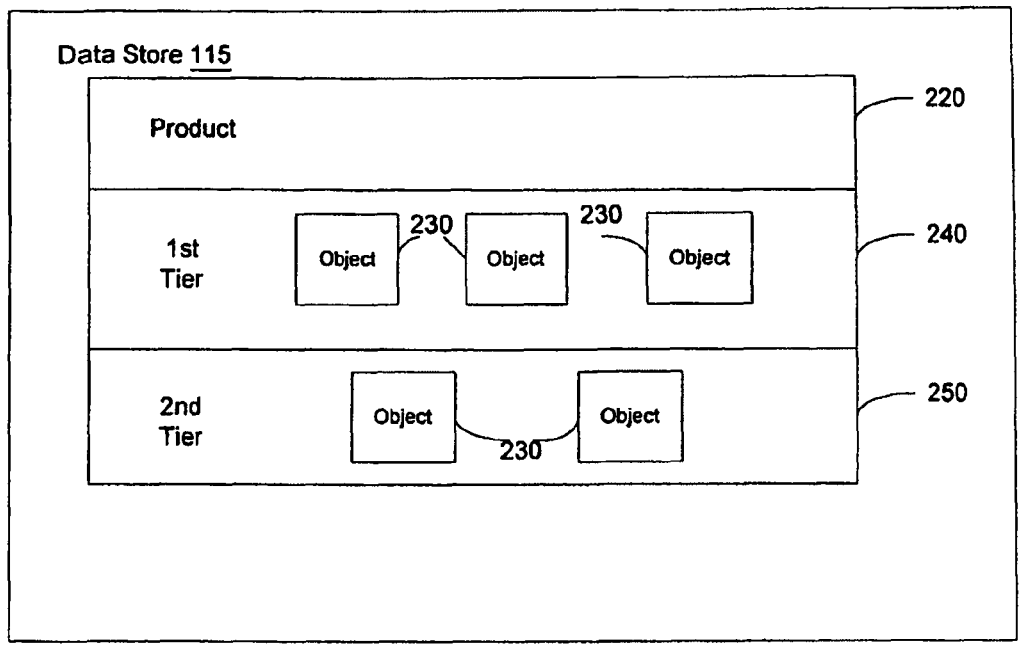
FIG. 2 is a block diagram illustrating an implementation of a data store in an entity of a product creation system.

FIG. 2 is a block diagram illustrating an example of a product record 220 stored in a data store 115, 125. The product associated with the product record 220 can include a specific product or a product line. The product record 220 can include object records 230, such as, for example, one or more class records. Classes can include, in the example of an automobile creation process, types, models, body styles, and sizes. Class records can contain information about classes or sub-classes of the product(s). Thus, each object record 230 in a first tier 240 can have one or more object records 230 in a second tier 250 associated with it.

Object records 230 can be organized in a variety of ways. In one implementation, the object records 230 can be organized in a tree structure with broader objects including narrower objects (or sub-objects) in its branches. For example, a first tier 240 of automobile classes can include types of automobiles, such as economy car, luxury car or sports car. Then, a second tier of automobile classes 250 can include models that are available under that type definition.

In a more general case, the product record 220 can include other types of objects and relationships between these objects. For example, object records 230 can include information about materials, structures, and/or goals.

Figure 3:
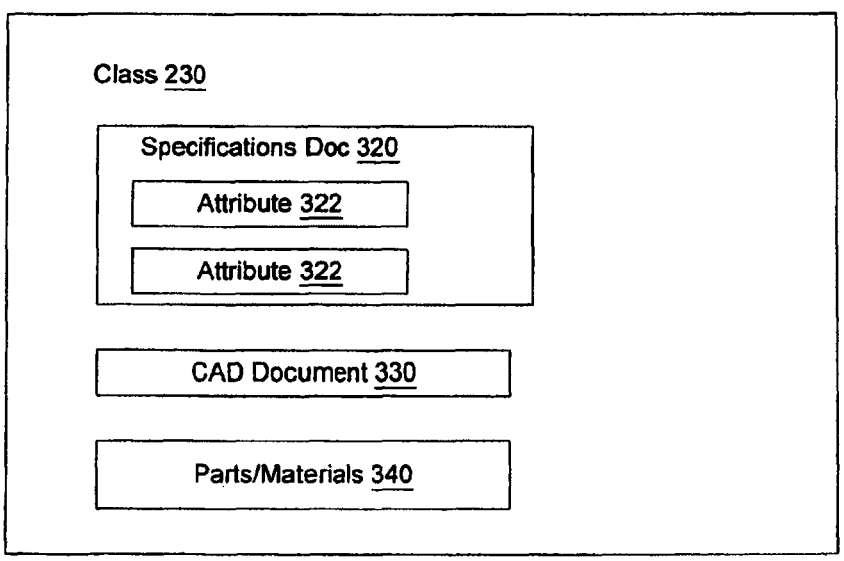
FIG. 3 is a block diagram illustrating a class record within a product record of the product creation system.

FIG. 3 is a block diagram illustrating a class record 230 within the product record (FIG. 2). Object record 230 can include a variety of documents, such as a specification document 320, a computer-aided design ("CAD") Document 330 and a Parts/Materials document 340.

The specification document 320 can include attribute records 322. Each attribute record 322 can contain information about an attribute associated with the product. Attributes can include component information such as engine type (e.g., 95 HP, 110 HP, 125 HP, etc.) or brake type (e.g., disc or drum), or characteristics such as body color (e.g., black, silver, red, etc.) or fuel efficiency (e.g., 25 m.p.g.). Each attribute record 322 can include a value for each attribute. For example, if the attribute record 322 stores information for the attribute "engine power," the information stored in the attribute record can include a value of "110 HP."

Figure 4:
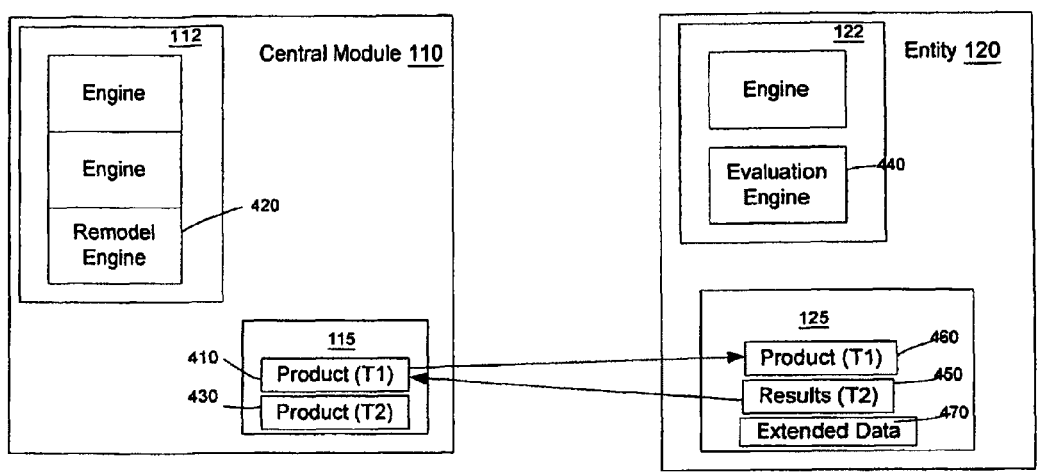
FIG. 4 is a block diagram illustrating an implementation of an external data management system in a product creation system.

FIG. 4 is a block diagram illustrating an implementation of an external data management system in a product creation system. Central module 110 includes product structures (T2) and (T2), stored in locations 410, 430 of data store 115. Central module 110 also includes a remodel engine 420.

Product structure (T1), stored in location 410, includes a product structure at time T1. The product structure can include all objects stored for a product. The remodel engine 420 integrates information received from other modules and/or changes to the product structure (T1).

The product structure (T2), stored in location 430, includes the product structure at time T2. The product structure (T2) includes a product structure defined in the remodel engine 420, incorporating the information or changes to the product structure (T1). The time T2 represents the time when central module 110 receives evaluation results data from entity module 120.

The entity module 120 includes a product structure (T1) stored in location 460, an evaluation engine 440, and results (T2), stored in location 450. Entity module 120 receives the product structure information into location 460 at time T1. The evaluation engine 440 performs evaluations based on the product structure (T1). The results of the evaluation, results (T2), are stored in location 450, and sent to the central module 110 at a time T2.

For example, the entity module 120 can include a module that performs car crash tests. The entity module 120 receives product structure (T1) at location 460, performs the car crash tests through evaluation engine 440, and stores the results (T2) in location 450. The entity module can locally extend the available data, i.e., product structure (T1), by including extended data 470. Extended data 470 can be used by entity module 120 to add context to the product structure (T1) in performing the evaluations in evaluation engine 440. In the car crash test example, the extended data can include a full fuel tank. The entity module 120 then transmits the results to central module 110. The extended data 470 is only relevant for the correct product structure, i.e., the product structure existing at T1 which is used to perform the evaluations. The extended data 470 is linked to product structure (T1), but does not become part of product structure (T1).

The central module 110 stores the received results, results (T2) with the product structure (T1) in location 410. The product structure (T2) stored in location 430 can include a link to the product structure (T1). The link to product structure (T1) in product structure (T2) can be labeled a historic product structure in a user interface. Thus, a virtual link is defined between the product structure (T2) and the results (T2) by adding the results (T2) to the product structure (T1). A user can access the results through a link to the product structure (T1) in a user interface.

Figure 5:
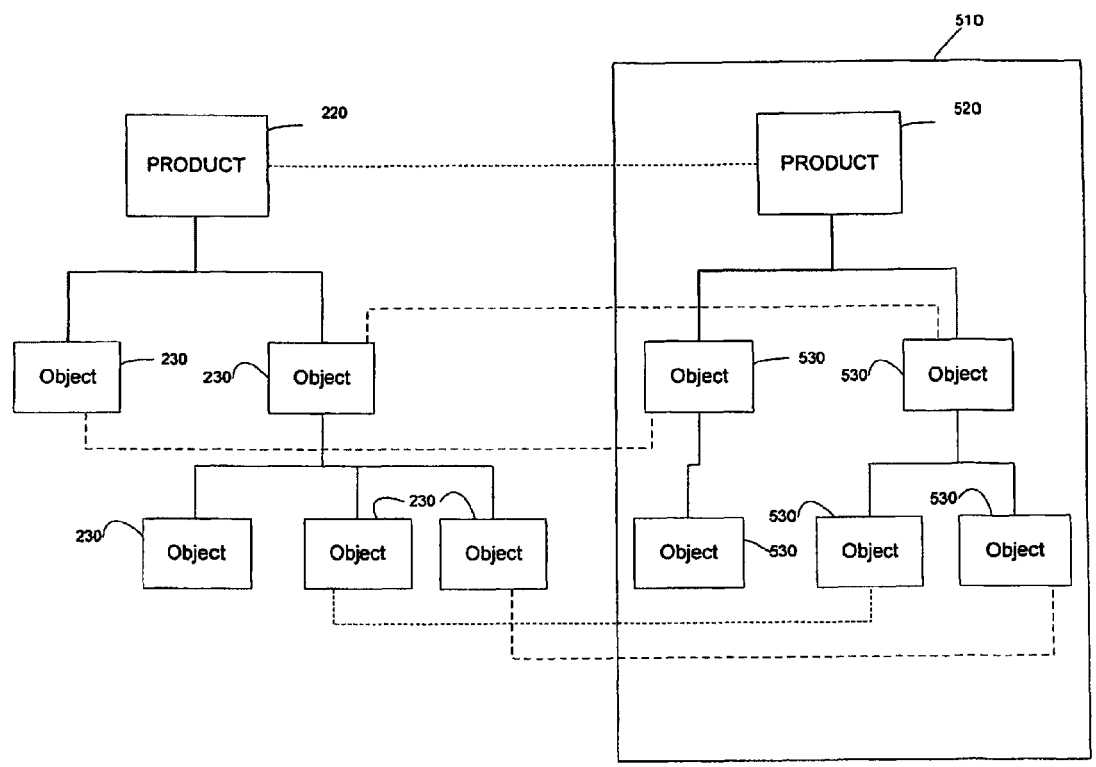
FIG. 5 is a block diagram illustrating an implementation of a product record including a link to historic data.

FIG. 5 is a block diagram illustrating an implementation of a product record including a link to historic data. The product record 220 can be part of the product structure (T2) module 430. The product record 220 is shown as a tree structure including a plurality of objects 230. The product record also includes a link to a historic structure 510. The historic structure can be the product structure (T1) stored in location 410. A user interface of the product record 220 can include the tree structure with a branch to historic structure 510 at every object 230 which has a corresponding historic object 530.

As shown in FIG. 5, historic product record 520 can include historic object records 530 associated with the historic product record 520. Each historic object record 530 is linked to a corresponding object record 230 in the current product record 220 which has a corresponding historic object 530.

The historic structure 510 can be different from the product structure 220. For example, the product record 220 can include changes in types of classes 230 defined or changes within class records 230, such as changes to attributes 322. Further, object records 230 in product record 220 may not correspond to historic object records 530. If an object record 230 has been added to product record 220 that was not in historic structure 510, there will not be a link from the historic structure 510 to the added object record 230. If an object record 530 that existed in the historic structure 510 has been deleted, and thus, no longer exists in the current product record 220, there will be no link from the deleted historic object record 530 to the current product record 220.

Figure 6:
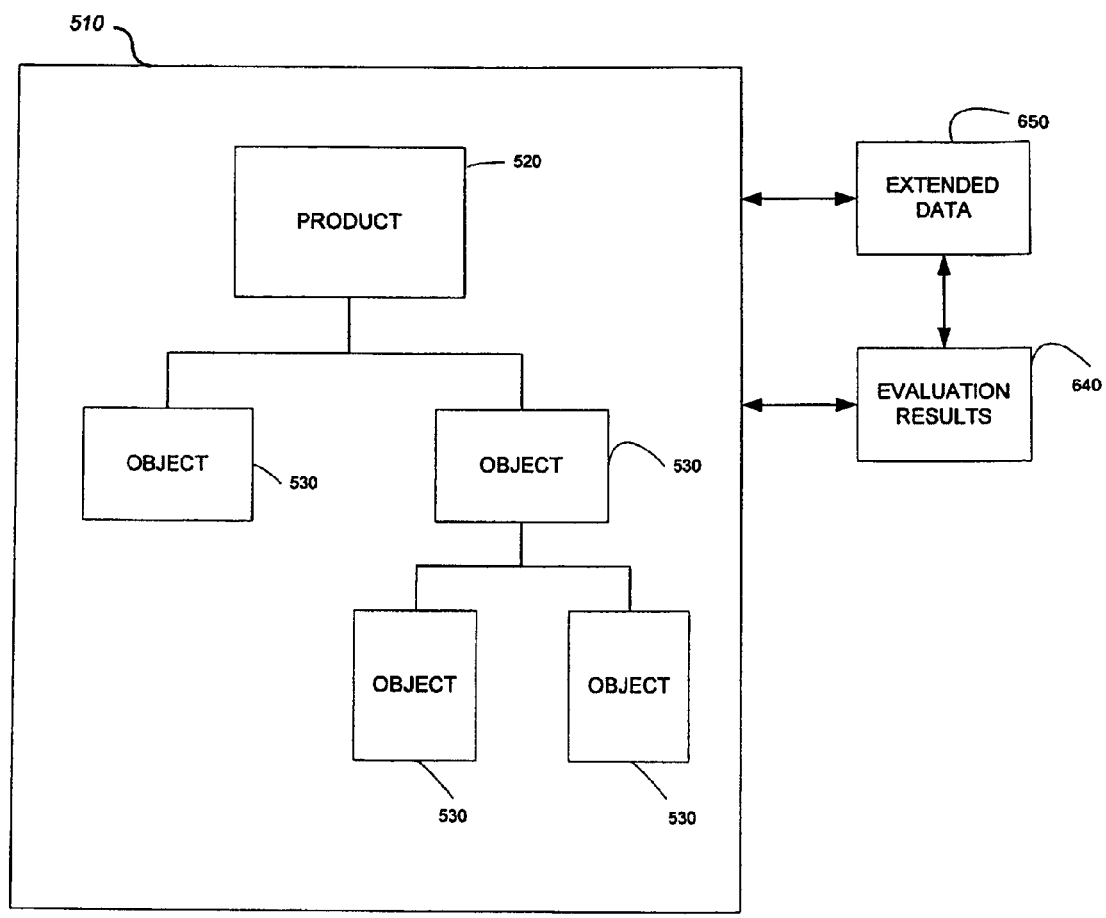
FIG. 6 is a block diagram illustrating an implementation of a historic product record.

FIG. 6 is a block diagram illustrating an implementation of a historic product record 510. As described above, the historic structure 510 can include the product structure (T1) stored in location 410.

The historic product structure 510 includes a link to extended data 650 and evaluation results 640, which includes results (T2), received from entity module 120. The evaluation results 640 can include a link to extended data 650, which can include the extended data 470 used by the entity module 120 to perform evaluations.

Figure 7:
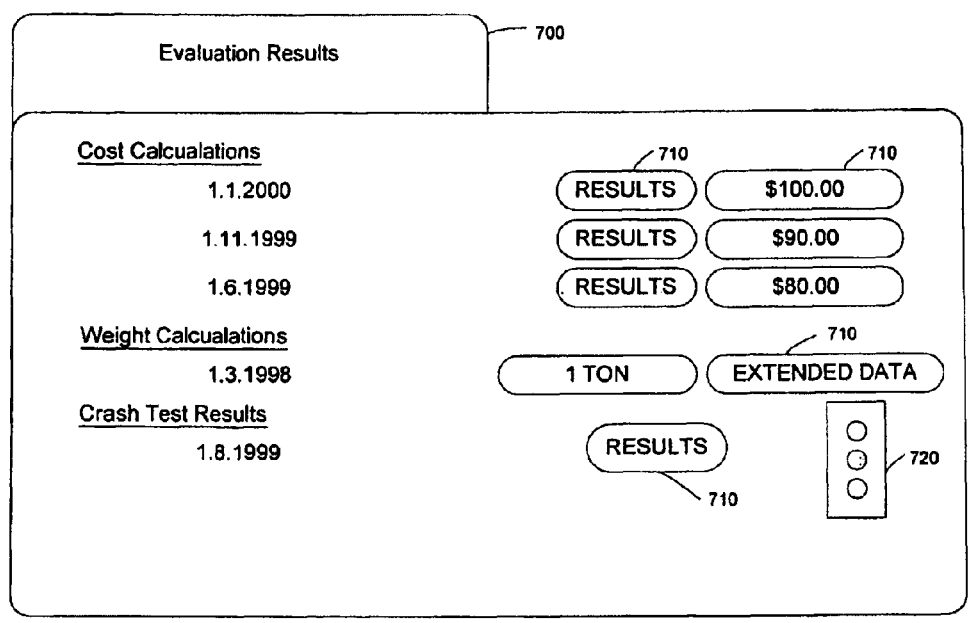
FIG. 7 is a block diagram illustrating an implementation of an external data record.

FIG. 7 is a block diagram illustrating an implementation of a user interface 700 of an external data record 640. The user interface 700 can include results from one or more entity modules 120. For example, the user interface 700 can display cost calculations performed by a cost management module, weight calculations performed by a verification module, and crash test results performed by a crash test module. Each listing of an evaluation result can include a scalar value, if a scalar value can be listed, and/or a user interface control 710 representing a link to a corresponding results record for the evaluation listed. In one implementation, the scalar value field can include the user interface control 710 to the corresponding results record for the evaluation listed.

The results can be listed by type of results, such as cost calculations, and date of results. The listing of the results can also include a user interface control representing a link to extended data used in obtaining the results.

A user can view a result record for a specific evaluation by selecting the user interface control 710 corresponding to the evaluation. Referring to FIG. 6, the result record can include the results 640 of the specific evaluation and a listing of or a user interface control representing a link to extended data 650 used to perform the evaluation.

Thus, for example, a user seeing that the cost of a part has been rising over the course of a year can select the user interface control 710 to retrieve the associated results record. The results record 710, and extended data, can include a link to the historic structure, which can indicate that some aspect of the part was substituted, increasing costs.

The user interface 700 can also include a traffic light symbol 720 or other indicator of what results corresponding to the traffic light symbol 720 suggest. For example, if the results of a crash test are negative, the traffic light 720 can include shading in the area corresponding to the red light. If the results indicate that a closer look should be given to the structure, the traffic light 720 can include shading in the area corresponding to the yellow light. If the results for the crash test were good, the traffic light 720 can include shading in the area corresponding to the green light.

Figure 8:
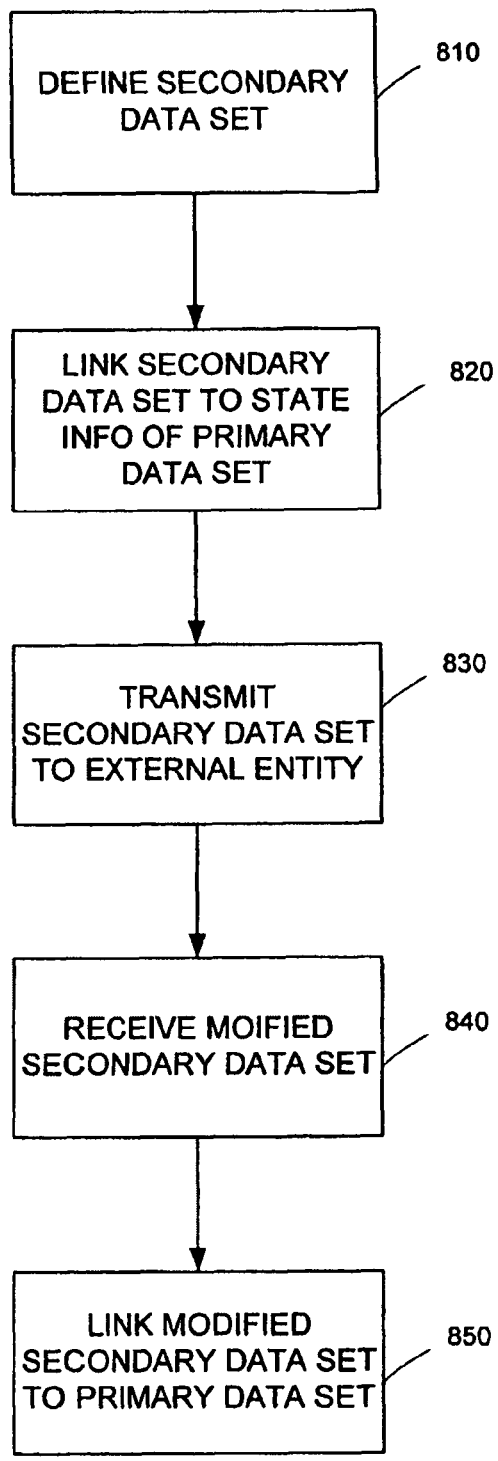
FIG. 8 is a flow diagram illustrating one implementation of a method for managing external data in a product creation system.

FIG. 8 is a flow diagram illustrating one implementation of a method for managing external data in a product creation system.

At step 810, a secondary data set is defined in the central module 110. The secondary data set can include a copy of the product structure (T1), representing a product record 220 at time Ti. At step 820, the central module 110 links the secondary data set to state information of a primary data set. The primary data set can include product structure (T1). The state information can include the time, T1, the secondary data set is created and sent to an external entity.

At step 830, the central module 110 transmits the secondary data set to an external entity, such as entity module 120. The external entity can perform evaluations on the secondary data set. The evaluations can include cost calculations, verification, crash tests, or other tests that the central module would like performed based on the product structure 220.

At step 840, the central module 110 receives a modified secondary data set. The modified secondary data set can include the results of the evaluations performed at the external entity. The central module 110 can also receive extended data with the results of the evaluations. The extended data can include data used by the external entity to perform evaluations. For example, for weight calculations for a car, the extended data can include the addition of a driver and/or 5 gallons of gasoline in the fuel tank.

At step 850, the central module 110 links the modified secondary data set to the primary data set based on the state information. If the primary data set or product record 220 has been modified, the modified secondary data set is stored with a record of the primary data set corresponding to the state information. Thus, if the state information includes a reference to a product structure at a time T1, the modified secondary data set can be stored with the product structure (T1) in location 410. The link between the modified secondary data set and the primary data set allows access by a user of a modified primary data set.

The method can also include linking the modified primary data set, represented by the product structure (T2), to the primary data set at time T1. Thus, the product structure (T2), stored in location 430 is linked to the product structure (T1). The product structure (T1) is labeled as a historic structure 510 in the product structure (T2).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A system to manage external data in a product creation process, the system comprising:
    a data storage system; and
    a processor configured to:
        receive, a first product structure from a central module;
        store the first product structure in the data storage system;
        perform evaluations on the first product structure;
        specify changes to the first product structure to be made by the central module;
        store results of the evaluations in the data Storage system; and
        transmit the changes and the results of the evaluations to a central module.

2. A machine-readable non-transitory storage medium having instruction data to cause a machine to:
    receive a first product structure from a central module;
    store the first product structure in the data storage system;
    perform evaluations on the first product structure;
    specify changes to the first product structure to be made by the central module;
    store results of the evaluations in the data storage system; and
    transmit the changes and the results of the evaluations to a central module.

3. A computer-implemented method comprising:
    receiving a first product structure from a central module;
    storing the first product structure in the data storage system;
    performing, using at least one processor coupled to a memory, evaluations on the first product structure;
    specifying changes to the first product structure to be made by the central module;
    storing results of the evaluations in the data storage system; and
    transmitting the changes and the results of the evaluations to a central module.

4. The system of claim 1, wherein the data storage system is further configured to store extended data for use in performing the evaluations.

5. The system of claim 1, wherein the results comprise cost calculations.

6. The system of claim 1, wherein the results comprise weight calculations.

7. The system of claim 1, wherein the results comprise crash test results.

8. The system of claim 1, further comprising a network interfacing the processor to the central module.

9. The system of claim 1, wherein the first product structure comprises a plurality of object records regarding one or more aspects of a physical product.

10. The method of claim 3, comprising storing extended data for use in performing the evaluations.

11. The method of claim 3, wherein the results comprise cost calculations.

12. The method of claim 3, wherein the results comprise weight calculations.

13. The method of claim 3, wherein the results comprise crash test results.

14. The method of claim 3, further comprising a network interfacing the processor to the central module.

15. The method of claim 3, wherein the first product structure comprises a plurality of object records regarding one or more aspects of a physical product.

16. The method of claim 3, wherein the first product structure comprises a copy of an original product structure at time T1.

17. The system of claim 4, wherein the results include a link to the extended data.

18. The method of claim 10, wherein the results include a link to the extended data.

* * * * *